(12) United States Patent
Koljonen

(10) Patent No.: US 6,193,594 B1
(45) Date of Patent: Feb. 27, 2001

(54) DEVICE FOR EXTRACTION OF FISHBONES

(76) Inventor: Kari Koljonen, Järneksgatan 3A, S-752 37 Uppsala (SE)

( * ) Notice: Subject to any disclaimer, the term of this patent is extended or adjusted under 35 U.S.C. 154(b) by 0 days.

(21) Appl. No.: 09/297,300

(22) PCT Filed: Oct. 28, 1997

(86) PCT No.: PCT/SE97/01789

§ 371 Date: Apr. 28, 1999

§ 102(e) Date: Apr. 28, 1999

(87) PCT Pub. No.: WO98/18335

PCT Pub. Date: May 7, 1998

(30) Foreign Application Priority Data

Oct. 28, 1996 (SE) .................................. 9603941

(51) Int. Cl.[7] .................................. A22C 17/02

(52) U.S. Cl. .................... 452/135; 452/82; 452/85

(58) Field of Search .................... 452/135, 138, 452/82, 83, 84, 85

(56) References Cited

U.S. PATENT DOCUMENTS

| | | | | |
|---|---|---|---|---|
| 2,268,581 | * | 1/1942 | Fisher | 452/84 |
| 2,618,811 | * | 11/1952 | Fisher | 452/84 |
| 5,196,021 | * | 3/1993 | Kabla | 452/85 |
| 5,911,621 | * | 6/1999 | Durst et al. | 452/83 |

FOREIGN PATENT DOCUMENTS

| | | |
|---|---|---|
| 0147285 | 7/1985 | (EP) . |
| 2425822 | 12/1979 | (FR) . |
| 467904 | 10/1992 | (SE) . |
| 95010344 | 9/1996 | (SE) . |

* cited by examiner

Primary Examiner—Willis Little
(74) Attorney, Agent, or Firm—Orum & Roth

(57) ABSTRACT

A device for extraction of bones from fish by means of a number of pivotal gripping means which are moving influenced to be driven along a course for controlled pressing of fishbones against a counterstay. Said gripping means are influenced to be guided by a guide in the shape of a channel to co-operate with the counterstay for achieving the desired pressing force between the gripping means and the counterstay.

10 Claims, 8 Drawing Sheets

DEVICE FOR EXTRACTION OF FISHBONES

The present invention relates to a device for extraction of bones from fish by means of a number of movable gripping means which are moving influenced to be driven along a course for controlled pressing of fishbones against a counterstay, wherein said gripping means are guided.

A through EP 0 567 515 B1 known apparatus for extraction of fish bones relates to a rotating bone press member which catches the fish bones by co-operation with a counterstay which is curved following the circumference shape of the rotating press member. The bones are gripped with the same pressing force independent of the kind of fish from which the bones are extracted. The angle at which the bones are extracted is thereby also large which might imply that the bones risk being broken when being pressed at such a large angle.

By means of SE patent application NO. 9501034-4, an apparatus is also known for extracting bones from fish by means of a number of pivotally moving gripping means which are moving influenced to be driven along a course For controlled pressing of fishbones against a counterstay with said gripping means guided along a straight distance plate, however without being able to achieve the desired pressing force between the gripping means and the counterstay. The pressing force will be what it will be if you do not carefully e.g. vary the size of the counterstay.

The main object of the present invention is therefore primarily to solve said problem with efficiently functioning means.

Said object is achieved with an apparatus according to the present invention, which is in the main characterized in that said gripping means are articulated via bearing shafts pivotally connected to a drive chain or a wheel to be positively forced to pivot with one of its ends around the bearing, that a guide consisting of a channel is arranged to guide the pivoting movement of said gripping means Dy co-operation with a member upon it, during the period which the drive apparatus is influenced to move in the direction of travel and that the shape of the channel is selected to be able to co-operate with a member of the gripping means, such as a shaft which is connected to it, wherein the gripping means are influenced to be guided by the channel to co-operate with the counterstay for achieving the desired pressing force between the gripping means and the counterstay.

Figure 1:
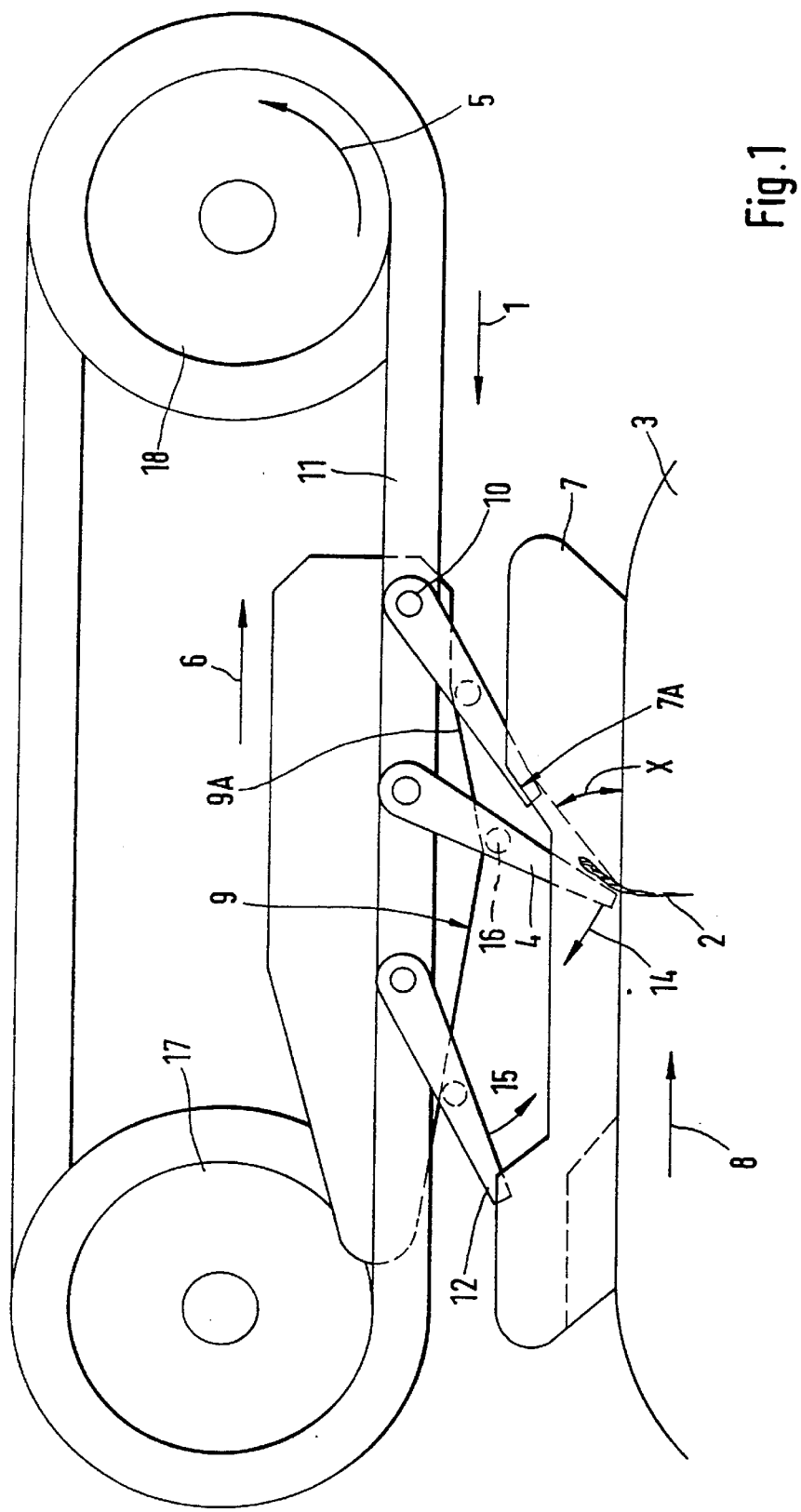
Figure 2:
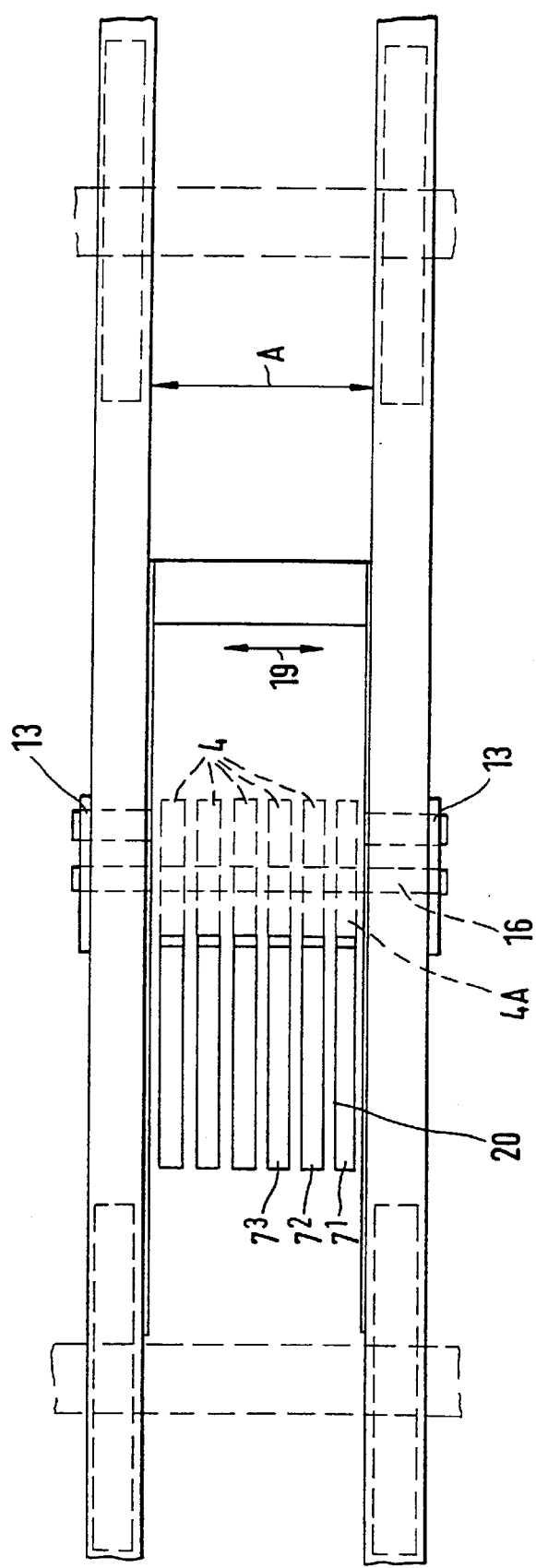
Figure 3:
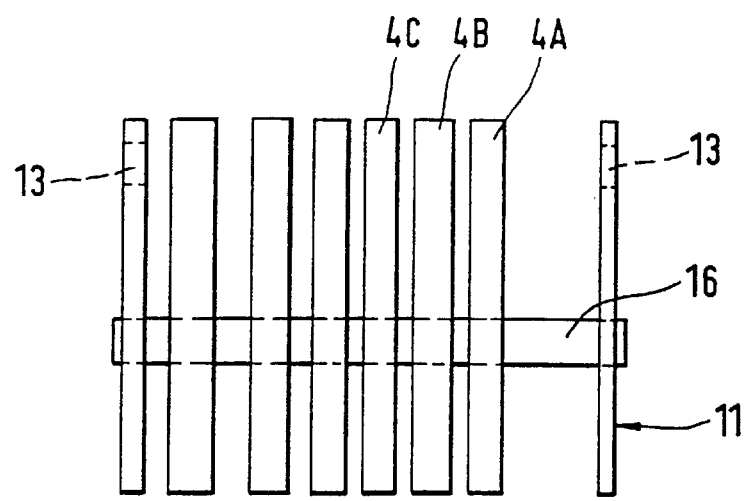
Figure 4:
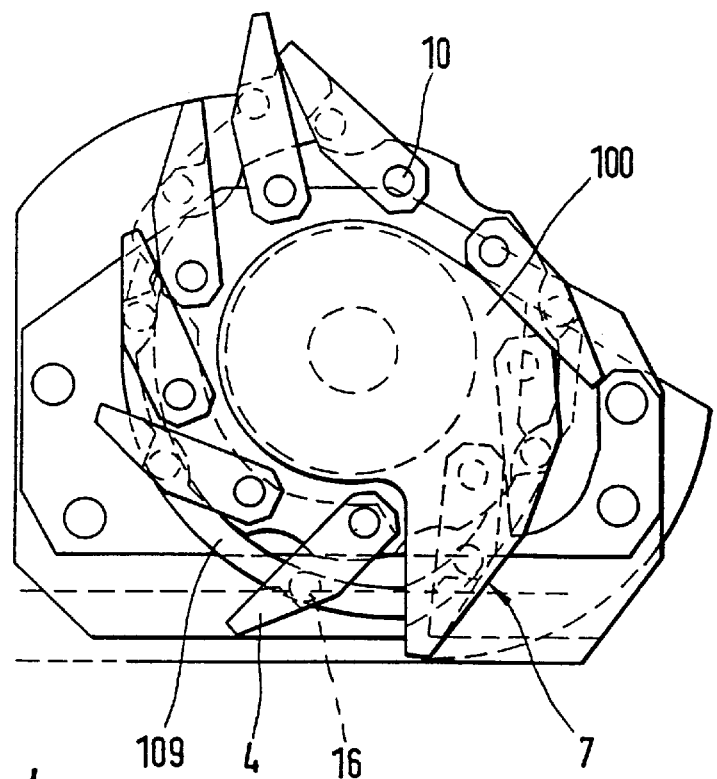
Figure 5:
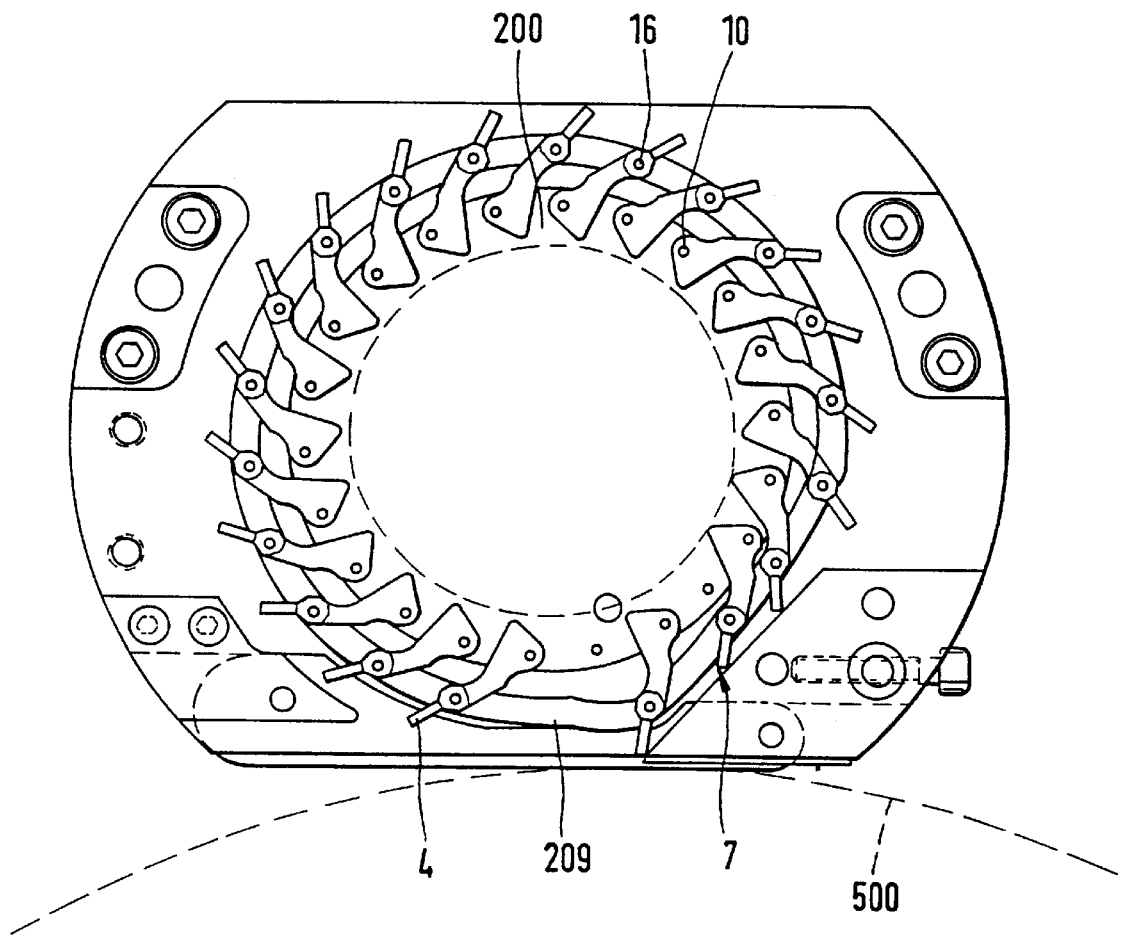
Figure 5A:
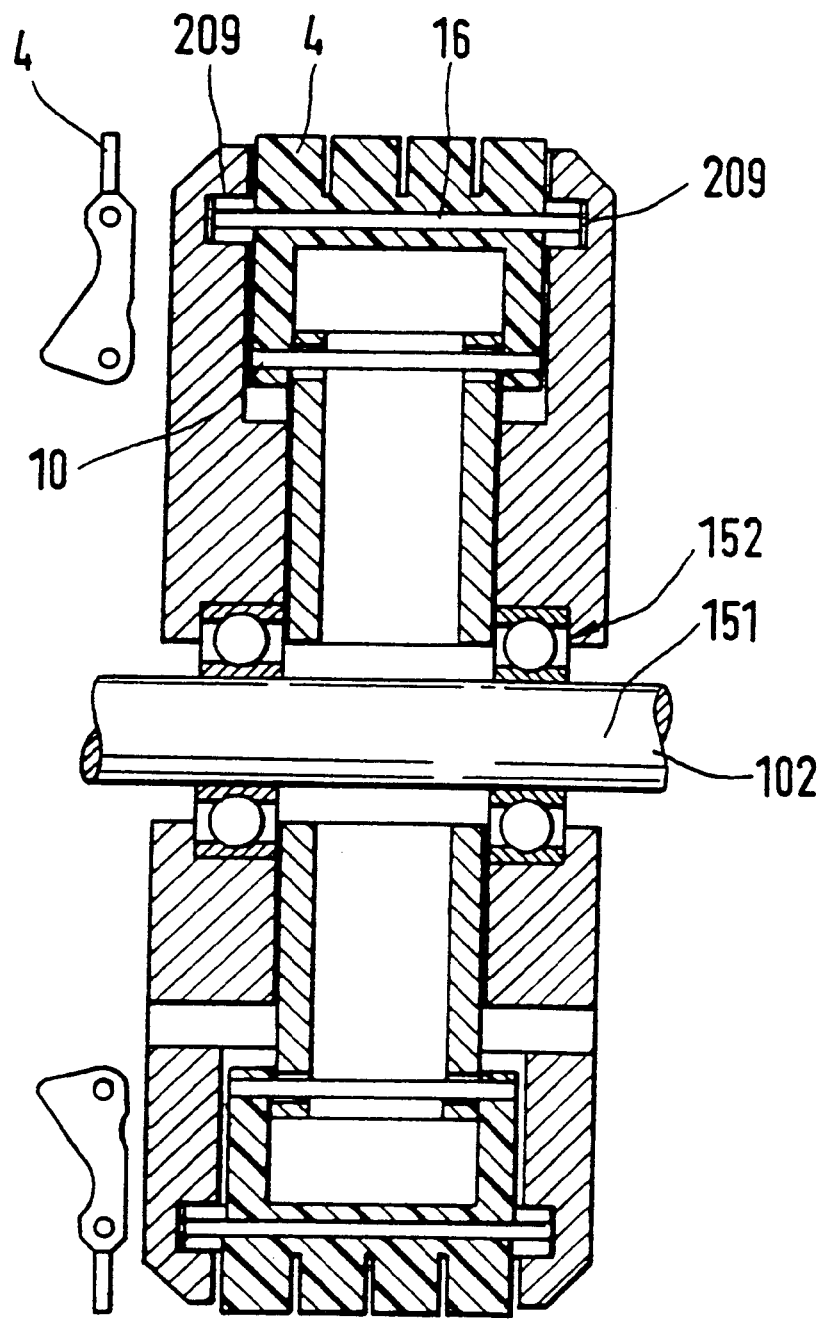
Figure 6A:
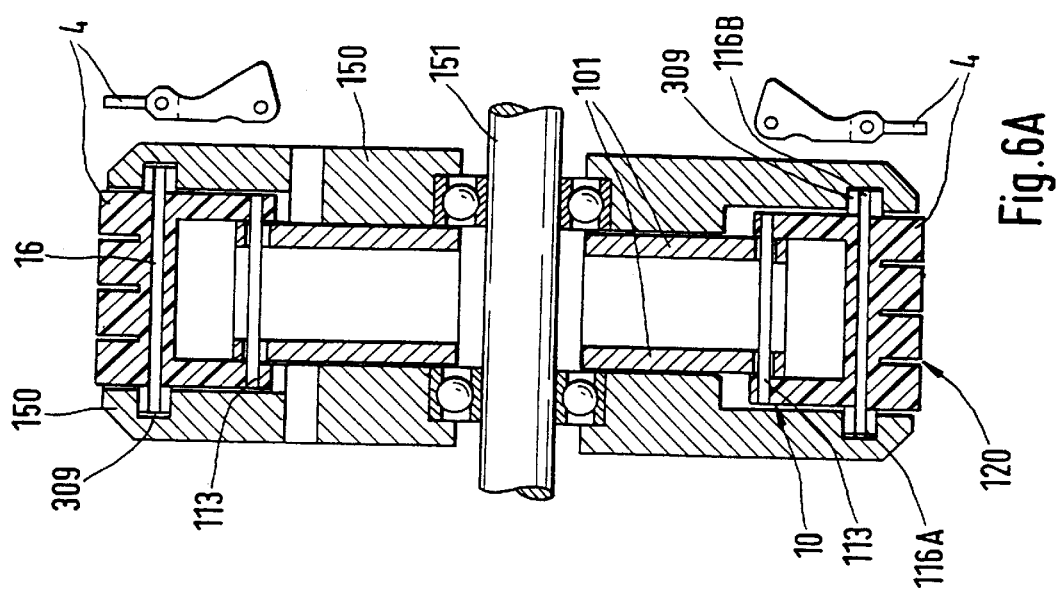
Figure 6:
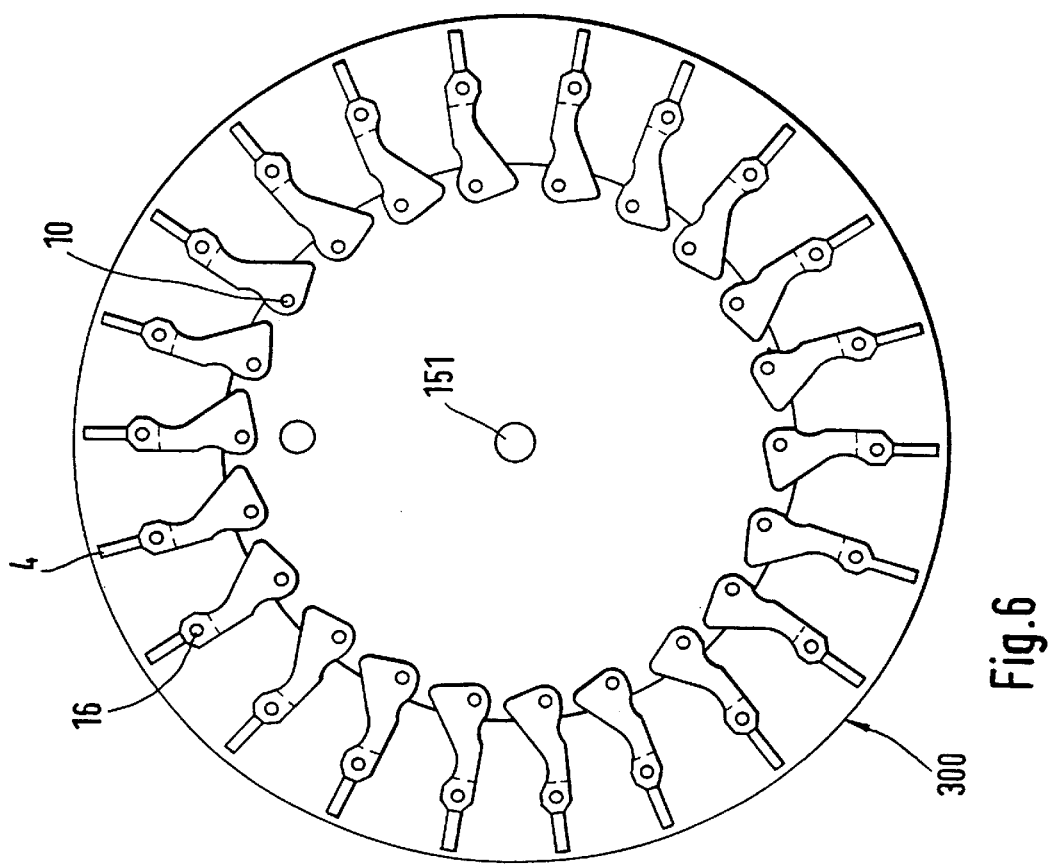
Figure 7A:
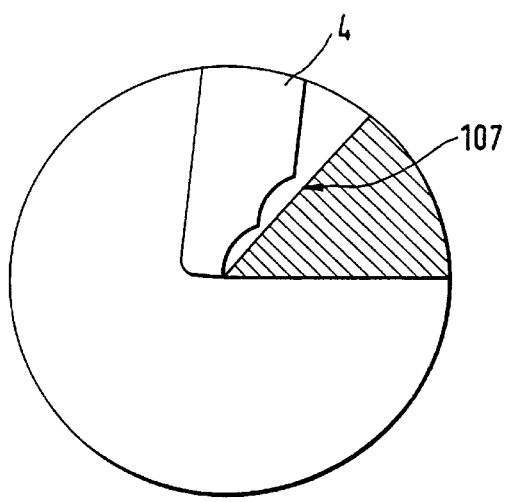
Figure 7B:
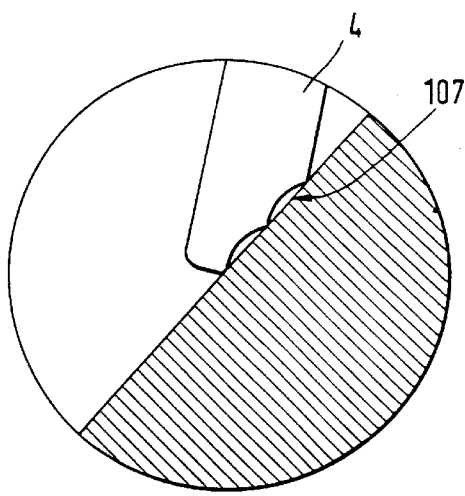
Figure 7D:
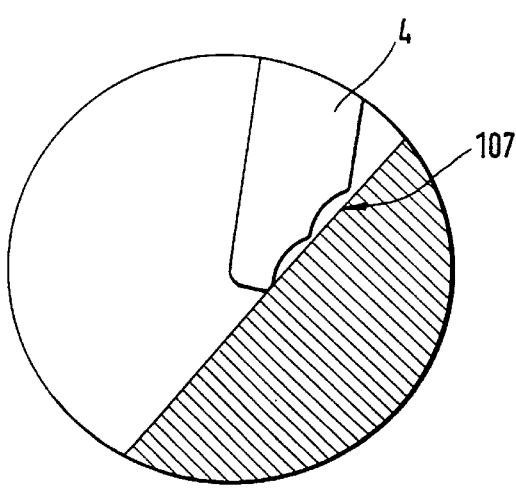
Figure 7C:
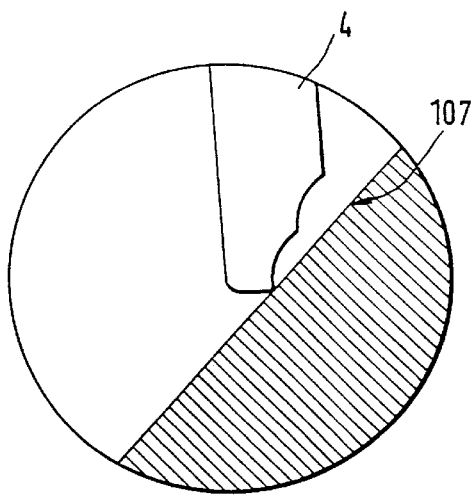
Figure 8:
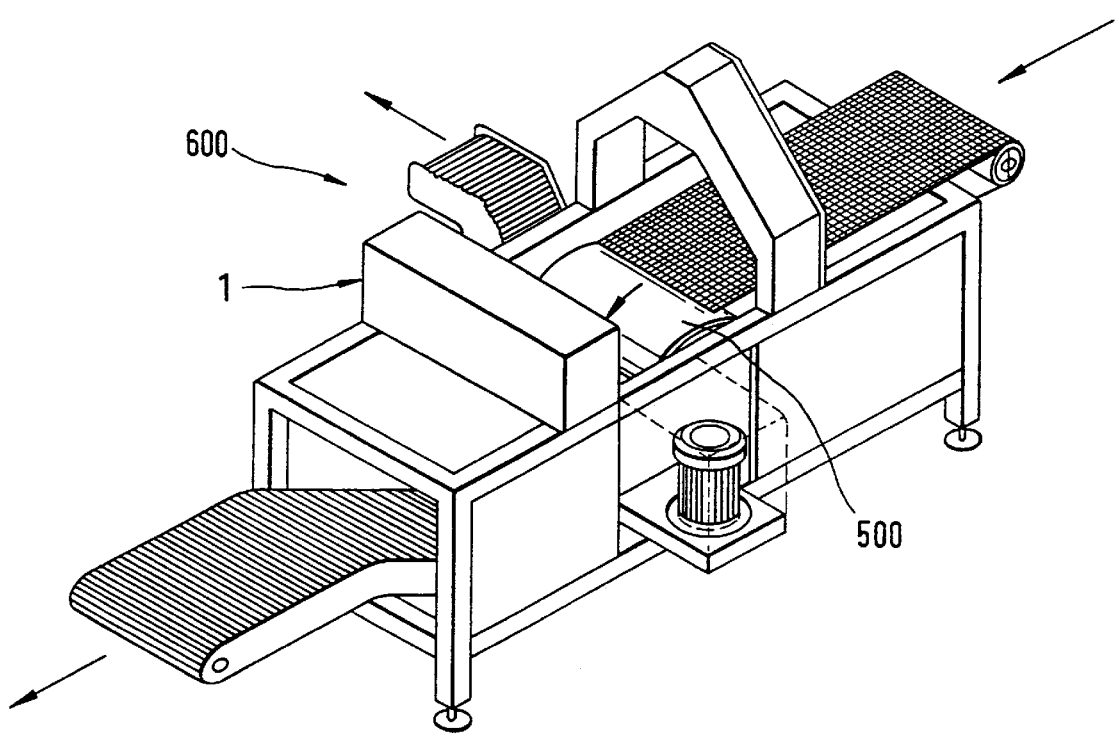

The invention will be described here below as a number of preferred embodiments with reference to drawings in which, FIG. 1 shows a side view of a bone extraction apparatus in a shown bone pressing position, FIG. 2 shows the apparatus from below, FIG. 3 shows a front view of the gripping means attached to a drive chain, FIG. 4 shows a diagrammatic sectional view of a variant of a bone extraction device, FIG. 5 and 5A shows still another variant of the device in co-operation with a drum freezer and shown as a sectional view and an edge view respectively, FIG. 6 and 6A shows a further example of a device and which. is illustrated as side view and longitudinal section respectively, FIG. 7A–7D shows in magnification different views of grip co-operation between a counterstay and a gripping means, and FIG. 8 shows a perspective view of a fish cleaning machine in which the device according to the present invention is comprised as an essential part.

A device 1 according to the present invention for extracting bones 2 from fish 3 by means of a number of movable gripping means 4, which are moving 5 influenced to be driven along a course 6 for controlled pressing of fish bones 2 against a counterstay 7, has said gripping means 4 influenced to be guided by guide influencing means 9 to co-operate with the counterstay 7 for achieving the desired press force between the gripping means 4 and the counterstay 7. The counterstay 7 extends with an acute angle X towards a path 8 of movement for fish 3 which the device 1 pulls out the bones 2 from and said angle is preferably between 40 and 60°, especially about 50°.

The mentioned counterstay 7 extends substantially straight along at least a substantial portion of its inclined part 7A.

The guide 9 is designed and adapted in order to distribute the forces in accordance with the need and the kind of fish.

In a machine for automatic bone extraction, the adjustment of the guide is arranged to be produced by means of a motor, preferably automatically, via means for this or manually via separate controls.

The above mentioned gripping means 4 are articulated 10 connected to a drive device 11 to be controlled and influenced to pivot with one end 12 around the bearing 10. The example illustrated in the drawings in FIG. 1–3 shows how said gripping means 4 are via bearing shafts 10 pivotally connected to a drive chain 11. It is also possible to connect the gripping means to a rotatable wheel, 100, 200, 300, as e.g. is shown in the further examples in FIG. 4–6.

Preferably, said gripping means 4 are double-sided attached in e.g. bolt holes 13 of chains in which the bearing shaft 10 is received extending between at mutual distances A from each other as seen from the side.

In FIG. 4–6 in the drawings is shown examples of application of the invention in connection with a rotating operating head in the form of a wheel 100, 200, 300, and where said gripping means 4 are pivotally journalled around a pivot bearing 10 which may be formed by a journal shaft which with its respective ends is received in holes 113 in the frame 101 of. the wheel at mutual distances. The wheel is carried rotatable driven upon a shaft 102.

A guide in shape of a stationary channel 9, which may be open or closed sideways, is thereby arranged to guide the pivot movement 14, 15 of said gripping means by co-operation with a member 16 on it during the time which the drive apparatus 11 is influenced to move in the driving direction 6, for example when one of a plurality of chain castor wheels 17, 18 are influenced to drive the chain 11 in the drive direction 6 via a motor. The shape of said channel 9 is selected so that it may co-operate with a member 16 of the gripping means 4 or a member which is connected to it, such as a shaft 16 which is connected to said gripping means 4. The channel 9 exhibits a substantially straight portion 9A the inclination of which substantially corresponds to the inclination of the counterstay at its inclined counterstay portion 7A.

In order to further improve the function of the invention, the counterstay 7 and the gripping means 4 are divided sideways 19 in the manner of ribs 4A, 4B, 4C, and so on, and $7^1, 7^2, 7^3$, and so on, respectively.

At each side of the rotatable journalled 152 rotating wheel 100, 200, 300 is arranged a rigidly attached stand 150 which is attached by screws to said cleaning machine, e.g. at a handle or at a floor mounted machine chassis. A guide channel 109, 209, 309 is present in the shape of e.g. apertures in the gables of said stand 150, extending in shape of the course with decreasing and increasing distance from the centre and it is desired that an in it received, sideways projecting member 116 e.g. a bearing shaft end 116A, 116B should follow when the wheel is rotated, wherein the gripping means 4 are controlled by force to pivot a corresponding amount as that which the actuator member 116 moves in the direction from and towards the centre 151 of the wheel respectively, so that one automatically receives the desired press function between the gripping means 4 and the appurtenant co-operating counterstay 107 which may be of a similar above described kind.

The function of the device should be evident from the above described and the drawings. Briefly should be mentioned, that when the chain 11 is driven in the direction according to the arrow 6, the gripping means 4 are brought to. follow a course which is predestined by the guide 9. The bone catching surface 7A of the counterstay 7 exhibits an inclination X which corresponds with the course which the outer ends 12 of the gripping means 4 describe, whereby the entire device 1 may be driven practically free from friction. When the fish fillet 3 moves in the direction of the arrow 8, the bones 2 that happen to come across raise up against the inclined part 7A of the counterstay 7 whereupon the gripping means 4 clamp the bones 2 against the counterstay 7 and moves the bones 2 along the counterstay 7 and further out from it. The guide member 16 may be formed by a shaft extending through the respective gripping means 4 and which may be journalled around its own shaft.

The corresponding is also true for the embodiment with the wheel construction which carries the pivotal gripping means 4.

Advantages with the invention are that the ribs 4 between in between located slits 20 and 120 respectively, press the fish meat down during processing. Thus, the invention is also well suited to be used for extracting bones from white fish like codfish, coalfish, haddock without in doing so removing unnecessary large amounts of fish meat or risking breaking off the bones 2.

The length of the gripping means 4 may preferably be varied in order to be able to pick the bones 2 out of a so called "dike" e.g. between the back fillet and the belly of the fish 3, and the counterstay 7 must in doing so thus be designed in a correspondingly suitable way.

The device 1 may preferably be adapted to enclose one part of a tubular drum 500 or similar onto which the fish fillet has adhered by freezing as is shown in FIG. 5.

The technique may be used both in hand, operated machines as well as whole or half automatic machines. Furthermore, the gripping means 4 may, according to the above, be arranged along the circumference of a wheel 200, 300, 400 and which co-operates with a suitable counterstay. The counterstays may also be driven in the same direction as the gripping means are driven but at a slower speed than these.

The invention enables an exact proportioning of the press forces during the time (about 0,1–0,2 s) that it takes to extract a bone. To get up the first approximately 5 mm is comparatively easy, then the object is to loosen the bone from its attachment in the fish which requires a maximum amount of grip. Therefore, the guide 11 should be designed and adapted in order to distribute the forces in accordance with the need and in accordance with the kind of fish. In an automatic machine, the adjustment of the guide is motorised and is handled automatically or via separate controls.

The bones are exposed for less mechanical wear due to the small inclination of the counterstay 7 in comparison with existing machines on the market where the bone is folded close to 90 degrees during the extraction process.

In FIG. 8 is shown a machine 600 which may be armed with four picking heads in accordance with the above described and operating in pairs. Two levels of cleaning takes place during operation, functional/technical and bacteriological, respectively. The functional/technical cleaning is going on continuously while the picking heads are in operation. The bacteriological cleaning takes place after automatic changing of the position of the picking heads. Also the last-mentioned cleaning takes place automatically and in closed accommodations inside the machine. Thus, the hygiene concerning the machine is very good and meets clearly stipulated requirements.

The invention is not limited to the above described and in the drawings shown embodiments, but may be varied within the scope of the claims without leaving the inventive concept.

What is claimed is:

1. A device (1) for extraction of bones (2) from fish (3) by means of a number of movable gripping means (4) which are moving influenced to be driven along a course (6) for controlled pressing of fishbones (2) against a counters, (7; 107), wherein said gripping means (4) are guided, (characterized in that said gripping means (4) are articulated via bearing shafts (10) pivotally connected to a drive chain (11) or a wheel (100 200, 300) to be positively forced to pivot with one of its ends (12) around the bearing (10), that a guide consisting of a channel (9; 109; 209; 309) is arranged to guide the pivoting movement (14, 15) of said gripping means by co-operation with a member (16) upon it, during the period which the drive apparatus (11; 100; 200; 300) is influenced to move in the direction of travel (6) and that the shape of the channel (9; 109; 209; 309) is selected to be able to co-operate with a member (16) of the gripping means (4), such as a shaft (16) which is connected to it, wherein the gripping means (4) are influenced to be guided by the channel (9; 109; 209; 309) to co-operate with the counterstay (7; 107) for achieving the desired pressing force between the gripping means (4) and the counterstay (7; 107).

2. A device according to claim 1, wherein in that the counterstay (7; 107) extends with an acute angle (X) towards a path of movement (8) for fish (3) which the device (1) pulls out the bones (2) from.

3. A device according to claim 2, wherein in that the angle (X) is between 40 and 60°, preferably about 50°.

4. A device according to claim 1, wherein the counterstay (7; 107) extends substantially in a straight line along at least a substantial portion of its inclined part (7A).

5. A device according to claim 1 wherein, the guide (9; 109; 209; 309) is designed and adapted to distribute the forces in accordance with the need and the kind of fish.

6. A device according to claim 5, claim 1, wherein in a machine (600) for automatic extraction of bones, the adjustment of the guide is arranged to be produced by means of a motor.

7. A device according to claim 6, claim 1, wherein the adjustment of the guide is arranged to take place automatically via means for it or manually via separate controls.

8. A device according to claim 1, wherein the gripping means (4) are double-sided attached in the bolt holes (13) of chains at mutual distances (A) from each other as seen from the side (19).

9. A device according to claim 1, wherein characterized in that the channel (9; 109; 209; 309) is provided with a portion (9A) the inclination of which substantially corresponds with the counterstay inclined part.

10. A device according to claim 1, wherein the counterstay (7; 107) and the gripping means (4) are divided transversely similar to ribs (4A, 4B, 4C etc. and 71, 72, 73 etc. respectively).

* * * * *